US010290921B2

(12) United States Patent
Feiner et al.

(10) Patent No.: US 10,290,921 B2
(45) Date of Patent: May 14, 2019

(54) WIRELESS ACCESS POINT INSTALLATION KIT AND METHOD

(71) Applicant: ANLA, Inc., Encino, CA (US)

(72) Inventors: Hagai Feiner, Topanga, CA (US); Bryce Alan Nordstrand, Redlands, CA (US)

(73) Assignee: ANLA, Inc., Encino, CA (US)

( * ) Notice: Subject to any disclaimer, the term of this patent is extended or adjusted under 35 U.S.C. 154(b) by 0 days.

(21) Appl. No.: 15/980,157

(22) Filed: May 15, 2018

(65) Prior Publication Data
US 2019/0103655 A1 Apr. 4, 2019

Related U.S. Application Data

(63) Continuation of application No. 15/722,260, filed on Oct. 2, 2017, now Pat. No. 9,972,887.

(51) Int. Cl.
*H01Q 1/00* (2006.01)
*H01Q 1/22* (2006.01)
*H04W 84/12* (2009.01)
*H04W 88/06* (2009.01)
*H01Q 1/42* (2006.01)
*H05K 7/02* (2006.01)

(52) U.S. Cl.
CPC ........... *H01Q 1/2291* (2013.01); *H01Q 1/007* (2013.01); *H04W 84/12* (2013.01); *H04W 88/06* (2013.01)

(58) Field of Classification Search
CPC .... H05K 7/1405; H01Q 1/2291; H01Q 1/007; H01Q 1/1214; H01Q 1/1221; H04W 88/08; G02B 6/4441; F16M 13/027; E04F 19/086; H02G 3/125
See application file for complete search history.

(56) References Cited

U.S. PATENT DOCUMENTS

| 6,249,671 | B1 | 6/2001 | Tucker et al. |
| 2009/0049791 | A1 | 2/2009 | Struthers et al. |
| 2015/0049452 | A1 | 2/2015 | Franck et al. |

OTHER PUBLICATIONS

Chatsworth Products, Inc., American Access Technologies, Inc., Product Information Sheet, 5"D (127mm) Ceiling Enclosure for Wireless Access Points/Bridges, May 2008, 1 page.
Chatsworth Products, Inc., Product Data Sheet, Wireless Access Point Enclosures for Drop Ceilings, Aug. 2011, 2 pages.

(Continued)

*Primary Examiner* — Ricardo I Magallanes
(74) *Attorney, Agent, or Firm* — SoCal IP Law Group LLP; Steven C. Sereboff; Guy Cumberbatch

(57) ABSTRACT

A system for securing the wireless access point within a ceiling or wall. The system includes a rough-in bracket including a frame member defining a window that closely receives an enclosure box sized to contain the wireless access point. The enclosure box includes a rear housing that extends through the rough-in bracket window and two pairs of rotatable dog ears that secure the enclosure box therein. Air vents are provided in only two sides of the enclosure box which are intended to be aligned with the longitudinal space between ceiling joists. Magnets on an inside face of anesthetic cover are attracted to ferromagnetic screws in the enclosure box used to rotate the dog ears. The enclosure box also features flexible arrangement of cable knockouts and includes structure for securing standard and nonstandard wireless access point devices therein.

19 Claims, 5 Drawing Sheets

(56) References Cited

OTHER PUBLICATIONS

Panduit Corp., Selection Guide, Panduit Wireless Access Point Enclosures, Dec. 2013, 6 pages.

Chatsworth Products, Inc., American Access Technologies, Inc., Product Information Sheet, 4" Deep Ceiling Enclosure for Wireless Access Points/Bridges, Apr. 2003, 1 page.

Lamson & Sessions, Carlon Zip Box Blue Switch and Outlet Boxes, Jun. 2006, 22 pages.

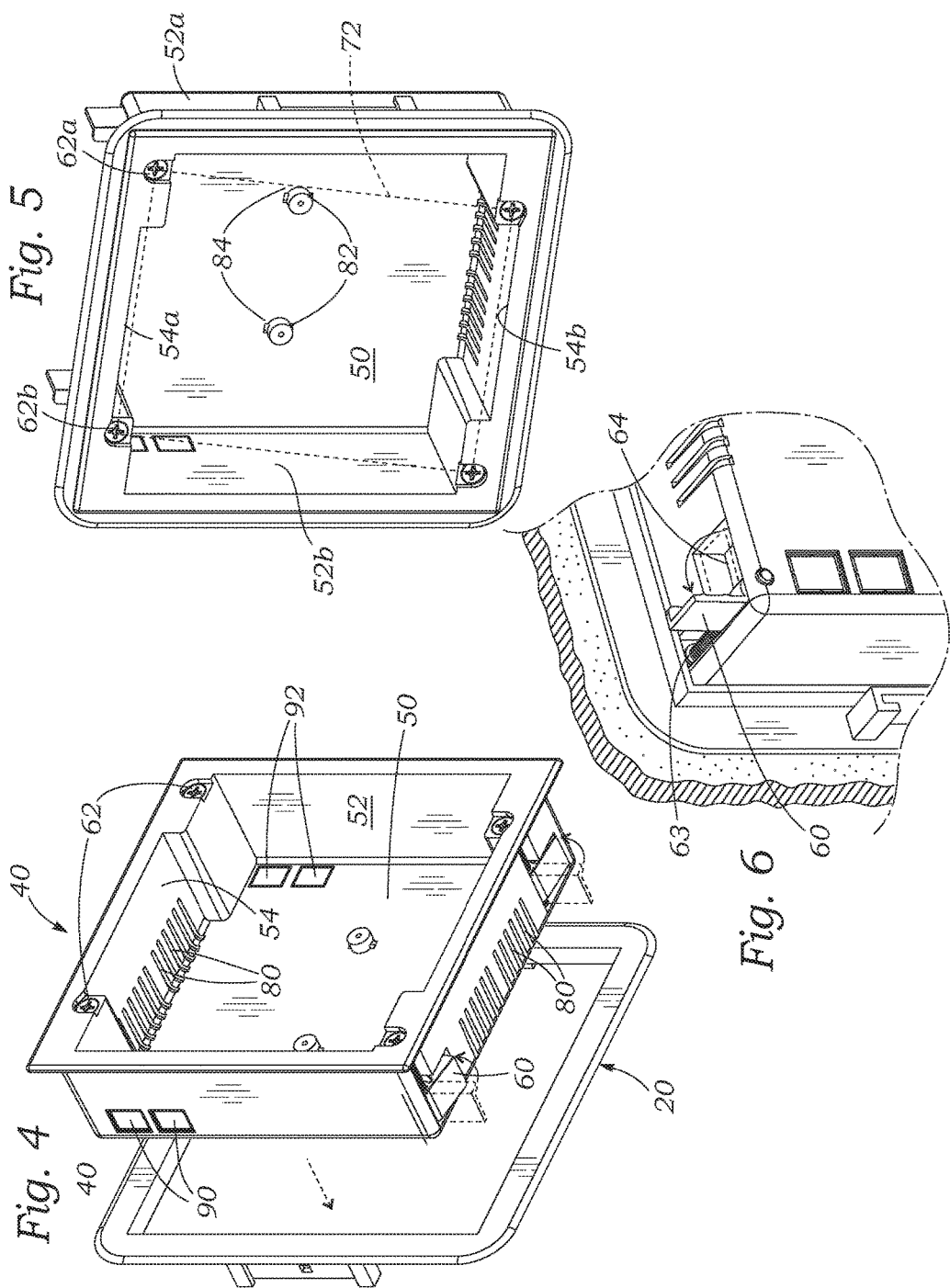

WIRELESS ACCESS POINT INSTALLATION KIT AND METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent is a continuation of application Ser. No. 15/722,260 filed Oct. 2, 2017, now U.S. Pat. No. 9,972,887, titled "ENCLOSURE FOR WIRELESS ACCESS POINT".

BACKGROUND

Field

This disclosure relates to a ceiling enclosure for a wireless access point.

Description of the Related Art

Wireless local area networks (WLANs) are becoming more common in the public and premise environment. Wireless LANs provide greater freedom for IT managers to create a network infrastructure that allows for flexible and mobile service to users. In a typical wireless LAN, wireless access points (WAP), small radio frequency transceivers, are distributed throughout the service area to create network connections for mobile wireless enabled devices such as laptops, IP phones and handheld devices. The access points are connected to the network with Ethernet cables that are part of a structured cabling system.

Wireless LANs are excellent alternatives for a variety of public and private enterprise locations as new or retrofit solutions. Public access to the Internet is now available through wireless connections in hotels, convention and meeting halls, retail malls, coffee shops and restaurants, airports, campuses and libraries. In private commercial spaces, wireless LANs provide network access to mobile workers in the office, meeting rooms, cafeterias, warehouses, industrial spaces and in outdoor work areas.

Enclosures provide physical protection for WAPs and the associated network connection. Manufacturers typically offer several styles of WAP enclosure to meet customer requirements. WAP enclosures can be placed within a drop ceiling or on the wall. One type of ceiling mounted enclosure a single drop ceiling tile and includes brackets that support the enclosure from the ceiling grid T-bars. Some enclosures have an access door that opens into the office space, and the WAIS is supported on the access door. Another WAP ceiling enclosure is suspended below the drop ceiling on a removable mounting plate.

Despite numerous WAP ceiling enclosures, there is a need for an enclosure that is easier to mount and enhances accessibility to the WAP.

SUMMARY

In one embodiment, a system for securing a wireless access point device, comprises an enclosure including a rectilinear rear housing defined by a rear face and a pair of parallel lateral sidewalls and a pair of parallel longitudinal sidewalls both extending forward from the rear face. A front facing extends along a front edge of the lateral and longitudinal sidewalls and defines an opening into an enclosure cavity formed within the rear housing sized to receive a wireless access point device therein. A pair of rotatable dog ears is provided in both of the longitudinal sidewalls and spaced rearwardly from the front facing. A rough-in bracket comprises a continuous frame member surrounding a window, the window sized to closely receive the rear housing and the rotatable dog ears being sized to extend outward beyond the window and behind the frame member so as to secure the enclosure to the rough-in bracket which may be secured to a structural support. Finally, an aesthetic cover attaches to the front facing and occludes the opening, the aesthetic cover sized to extend outward beyond the front facing so as to completely mask the enclosure.

Another system for securing a wireless access point device disclosed herein comprises an enclosure including a rear housing defined by a rear face and a plurality of sidewalls extending forward from the rear face. A front facing extends along a front edge of the sidewalls and defines an opening into an enclosure cavity formed within the rear housing sized to receive a wireless access point device therein. A pair of rotatable dog ears provided in each of two opposed sidewalls rotate between a flush position within a periphery of the front facing and a retention position extending out from the front facing for securing the enclosure within a surrounding support. A first pair of knockouts provided in a first one of the sidewalls are sized to closely receive and hold a cable jack, and a second pair of knockouts provided in the rear face are sized to closely receive and hold a cable jack, the second pair of knockouts the located adjacent a different one of the sidewalls. A pair of mounting studs in the rear face is spaced apart a standard distance for securing with fasteners to a pair of complementary mounting fixtures in a rear wall of a wireless access point device placed within the enclosure cavity. Finally, an aesthetic cover is configured to attach to the front facing and occlude the opening, the aesthetic cover sized to extend outward beyond the front facing so as to completely mask the enclosure.

DESCRIPTION OF THE DRAWINGS

FIG. 4 is a perspective exploded view of the wireless access point enclosure and rough-in bracket.

FIG. 5 is a perspective assembled view of the wireless access point enclosure and rough-in bracket.

FIG. 6 is an enlarged perspective view of a rear corner of the wireless access point enclosure showing actuation of one rotatable dog ear for securing the enclosure within the rough-in bracket.

Throughout this description, elements appearing in figures are assigned three-digit reference designators, where the most significant digit is the FIG. number where the element is introduced and the two least significant digits are specific to the element. An element that is not described in conjunction with a FIG. may be presumed to have the same characteristics and function as a previously-described element having the same reference designator.

DETAILED DESCRIPTION

A ceiling enclosure for a wireless access point (WAP) is disclosed which is easier to mount and enhances accessibility to the WAP.

A system for securing the wireless access point within a ceiling or wall includes a rough-in bracket including a frame member defining a window that closely receives an enclosure box sized to contain the wireless access point. The enclosure box includes a rear housing that extends through the rough-in bracket window and two pairs of rotatable dog ears that secure the enclosure box therein. Air vents are provided in only two sides of the enclosure box which are intended to be aligned with the longitudinal space between ceiling joists. Magnets on an inside face of anesthetic cover are attracted to ferromagnetic screws in the enclosure box used to rotate the dog ears. The enclosure box also features flexible arrangement of cable knockouts and includes structure for securing standard and nonstandard wireless access point devices therein.

The enclosure may be mounted within a ceiling or in walls. The enclosure is intended to mate with a plurality of WAP devices, and as will be described includes both traditional and non-traditional mating structure. The enclosure may be generally 10 inches square on each side so as to fit between ceiling joists conventionally spaced 16 inches apart. However, ceiling joists are sometimes spaced apart greater distances, and the enclosure can be larger than 10 inches square, such as 12 or 24 inches on each side. Prior to a description of the advantageous features of the present enclosure, an exemplary procedure for mounting it within a ceiling will be described.

Figure 1A:
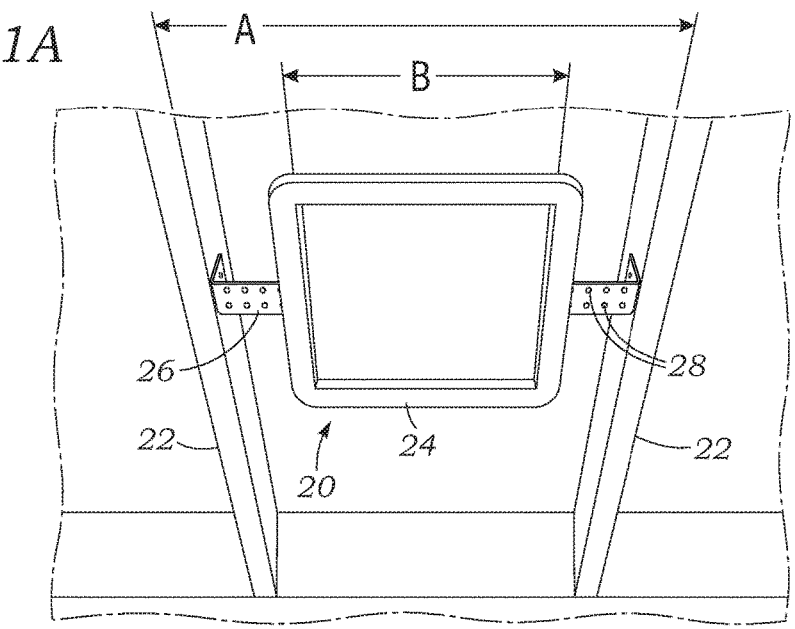
FIG. 1A is a perspective view looking up at an unfinished ceiling and showing a rough-in bracket mounted between two adjacent ceiling joists.

FIG. 1A is a perspective view looking up at an unfinished ceiling and showing a rough-in bracket 20 of the present application mounted between two adjacent ceiling joists 22 that are parallel and define a longitudinal direction. The rough-in bracket 20 comprises a continuous square frame 24 to which two mounting straps 26 attach extending laterally in opposite directions. The straps 26 include two rows of fastener holes 28 and each has a length that is sufficient to reach the adjacent joist 22. The straps 26 may be metallic, plastic or another material strong enough to support the enclosure and its contents. Each strap 26 may be bent 90° and attached to the inside surface of the respective joist 22 using fasteners such as nails or screws, although other attachment means are possible.

The spacing between the joists 22 is shown as dimension A, which is typically 16 inches in the U.S. This spacing may vary depending on the type of ceiling, as well as from differing standards around the world. Dimension B corresponds to the inner dimension of the square window defined by the frame 24. Ultimately, the square window in the frame 24 closely receives the wireless access point (WAP) enclosure. The dimension B may be less than the spacing A between the joists 22, and may leave a space of at least 3 inches between the WAP enclosure and either joist for good ventilation. For example, if the spacing A is 16 inches, the dimension B may be no more than 10 inches. However, as will be described below, the WAP enclosure features vents on two longitudinal sides that may be perpendicular to the joists 22, and thus even smaller spacing between the WAP enclosure and the joists is possible without compromising cooling flow.

Figure 1B:
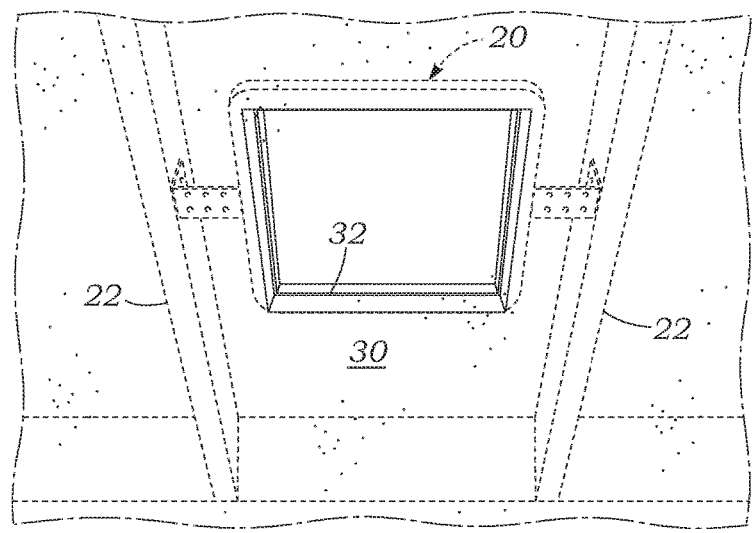
FIG. 1B is a perspective view looking up at a finished ceiling showing drywall attached under the joists and rough-in bracket and a square hole cut in the drywall matching one defined by the rough-in bracket.

FIG. 1B illustrates a panel of drywall 30 attached under and flush with the joists 22 and the rough-in bracket 20, with a square hole 32 cut in the drywall matching the square window defined by the rough-in bracket. The rough-in bracket 20 thus gives the drywall finishers a guide/template for cutting the hole 32 in the correct spot.

Figure 1C:
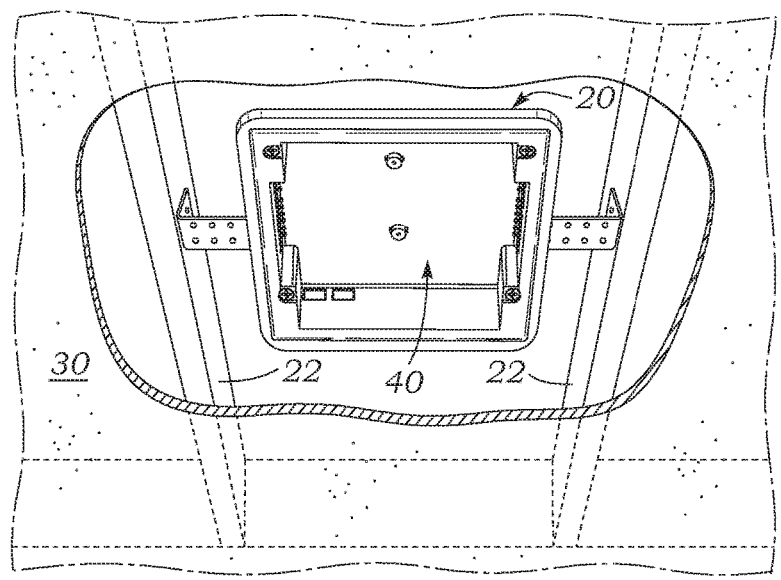
FIG. 1C is a perspective view looking up at the finished ceiling with a portion of the drywall cutaway to show a wireless access point enclosure secured to the rough-in bracket and prior to introduction of a wireless access point (WAP) therein.

FIG. 1C shows a portion of the drywall 30 cut away to show a WAP enclosure 40 secured to the rough-in bracket 20, prior to introduction of a wireless access point device therein. Because the WAP enclosure 40 is sized to closely fit through the square window in the rough-in bracket 20, and it has a square outer profile of about 10 inches on each side. The WAP enclosure 40 may include rotatable tabs or dog ears that are used to quickly and easily ensure that the enclosure is supported by the rough-in bracket 20. A portion of the WAP enclosure 40 depends downward within the square window in the bracket 20 approximately to the elevation of the lower face of the drywall 30. The WAP enclosure 40 defines a cavity that extends upward above the drywall 30 into the space between the joists 22 for receiving the wireless access point.

Figure 1D:
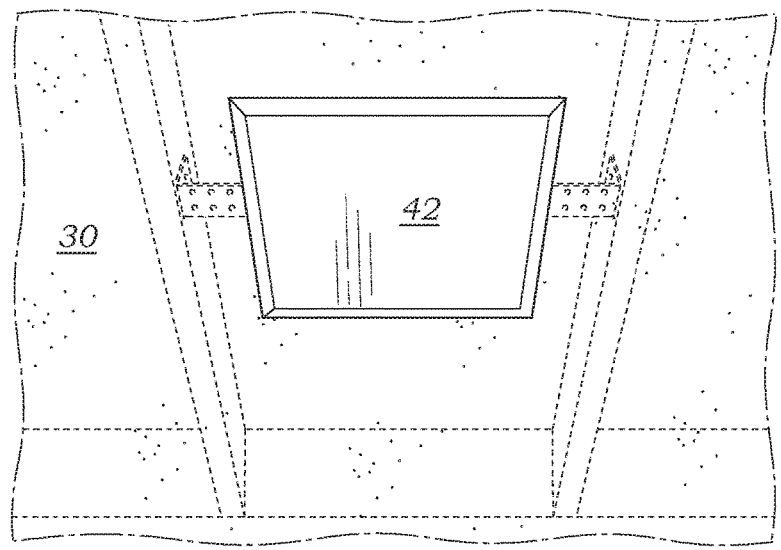
FIG. 1D is a perspective view looking up at the finished ceiling after attachment of an aesthetic cover under the wireless access point enclosure.

Finally, FIG. 1D shows the finished ceiling after attachment of an aesthetic cover 42 under the WAP enclosure 40. The cover 42 may be provided in a number of different shapes, and may be made of a material such as plastic with no RF attenuation to avoid interfering with the signals from the wireless access point. Although not shown, the wireless access point has been installed within the WAP enclosure 40 prior to assembly of the cover 42. The aesthetic cover 42 is configured to attach to the front facing and occlude the opening to the cavity of the WAP enclosure 40, and is sized to extend outward beyond and completely mask the enclosure. All that is visible in the ceiling is the cover 42.

The WAP enclosure 40 is capable of receiving a plurality of different types of wireless access point devices. The enclosure 40 features both standard and nonstandard structure for securing various configurations of wireless access devices.

Figure 2A:
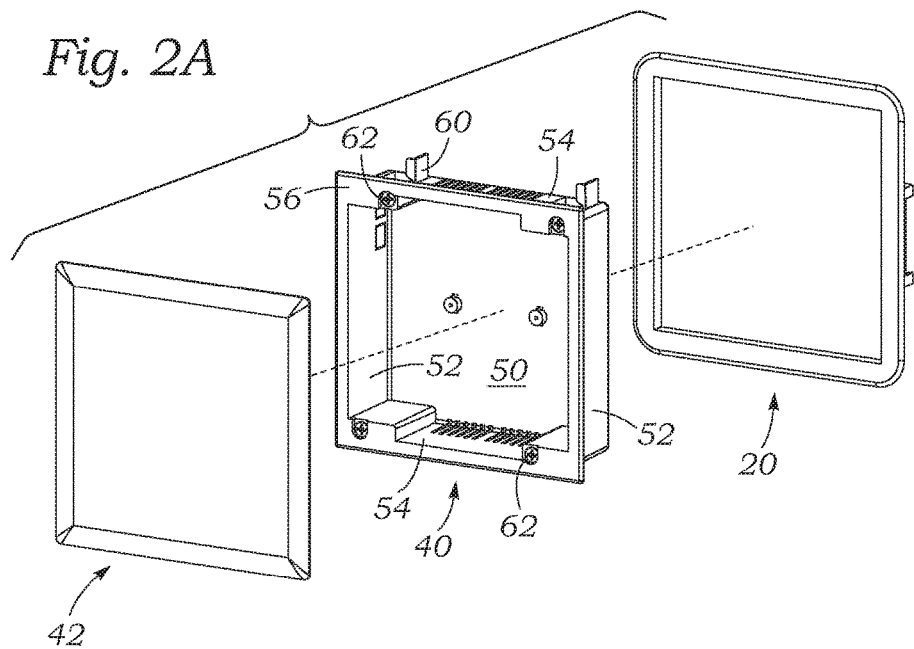
FIG. 2A and FIG. 2B are front and rear exploded perspective views, respectively, of the wireless access point enclosure and rough-in bracket along with a square aesthetic cover.
Figure 2B:
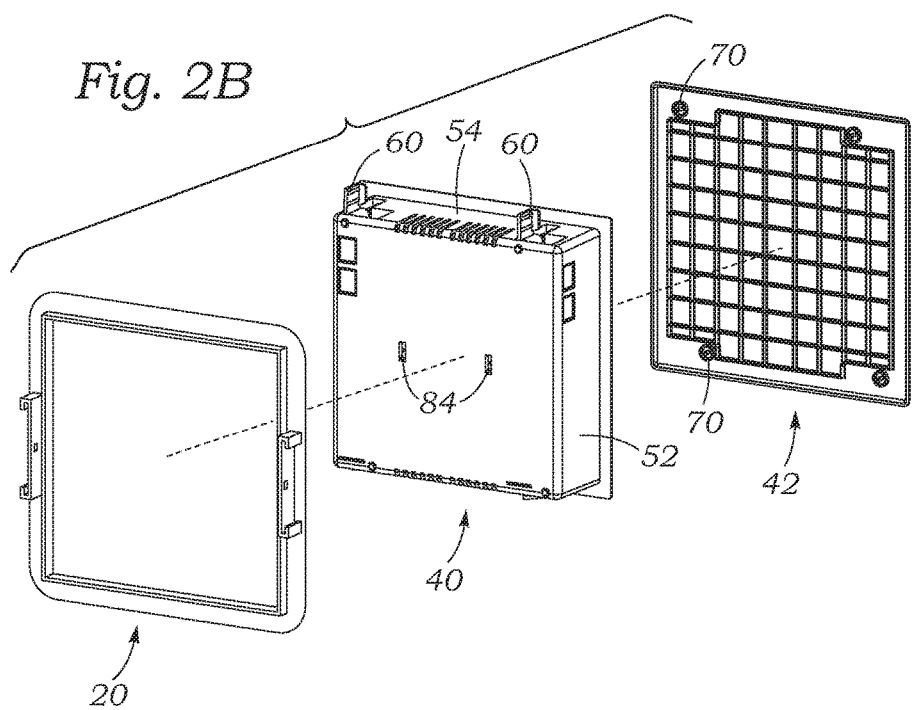

FIG. 2A and FIG. 2B are front and rear exploded perspective views, respectively, of the WAP enclosure 40 and rough-in bracket 20 along with a square aesthetic cover 42. The WAP enclosure 40 includes a rear housing defined by a rear face 50, two lateral sidewalls 52, and two longitudinal sidewalls 54. The rear housing is sized to closely fit through the square window defined by the rough-in bracket 20. A front facing 56 extends outward from each of the sidewalls 52, 54 and is sized to cover and conceal the rough edges of the square hole 32 cut in the drywall.

The WAP enclosure 40 includes a plurality of rotatable tabs or dog ears 60 in both of the longitudinal sidewalls 54 that are initially flush with the sidewalls and may be rotated 90° outward into the positions as shown in FIG. 2A and FIG. 2B. One or more of the dog ears 60 connects to a rotatable actuating bolt or screw 62 having a forward-facing head approximate flush with the front facing 56. As seen in FIG. 6, thin retention washers 63 on the actuating screws 62 are positioned just inside a wall of the enclosure 40 through which the bolt passes to prevent the bolts from migrating out of their locations. The dog ears 60 may rotate about a front-to-rear axis and are controlled by the front-facing actuating screws 62. In general, the dog ears 60 rotate between a flush position within a periphery of the front facing 56 and a retention position extending out from the front facing for securing the enclosure 40 within a surrounding support such as the rough-in bracket 20.

To secure the WAP enclosure 40 to the rough-in bracket 20, an installer respectively rotates the actuating screws 62 counterclockwise to rotate the dog ears 60 into their retracted positions flush with the longitudinal sidewalls 54. The rear housing may then be inserted through the square window in the rough-in bracket 20 after which the screws 62 are rotated in a clockwise direction to convert the dog ears 60 to their extended positions. Because the dog ears 60 are positioned adjacent rear edges of the rear housing, they extend behind (above when mounted in the ceiling) the rough-in bracket 20. The dog ears 60 thus function as similar devices in so-called "Old Work" connectors used in conventional outlet enclosures. However, there are two dog ears 60 provided in each sidewall 54, whereas "Old Work" outlet boxes typically only have one dog ear on each side.

Two dog ears 60 may be provided at opposite ends of each of the longitudinal sidewalls 54. The absence of dog ears 60 in the lateral sidewalls 52 ensures that they do not interfere with the metallic mounting straps 26 of the rough-in bracket 20.

As seen in FIG. 2B, the aesthetic cover 42 has a plurality of magnets 70 secured to a rear face thereof that align with the actuating screws 62. The screws 62 may be formed of a ferromagnetic material such as steel and the attraction of the magnets 70 to the screws is sufficient to hold the relatively lightweight cover 42 in place. The cover 42 may extend slightly beyond the outer edges of the front facing 56 to ensure that none of the rough drywall edges are visible. The cover 42 may be made of a material such as a hard plastic that can be painted the same color as the ceiling, so as to better blend in.

Figure 3A:
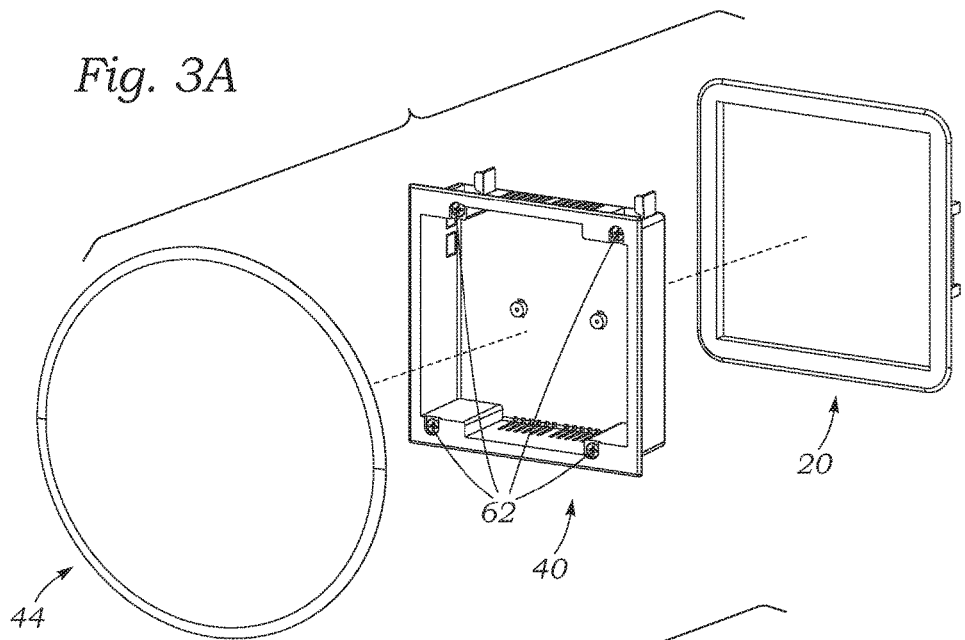
FIG. 3A and FIG. 3B are front and rear exploded perspective views, respectively, of the wireless access point enclosure and rough-in bracket along with a circular aesthetic cover.
Figure 3B:
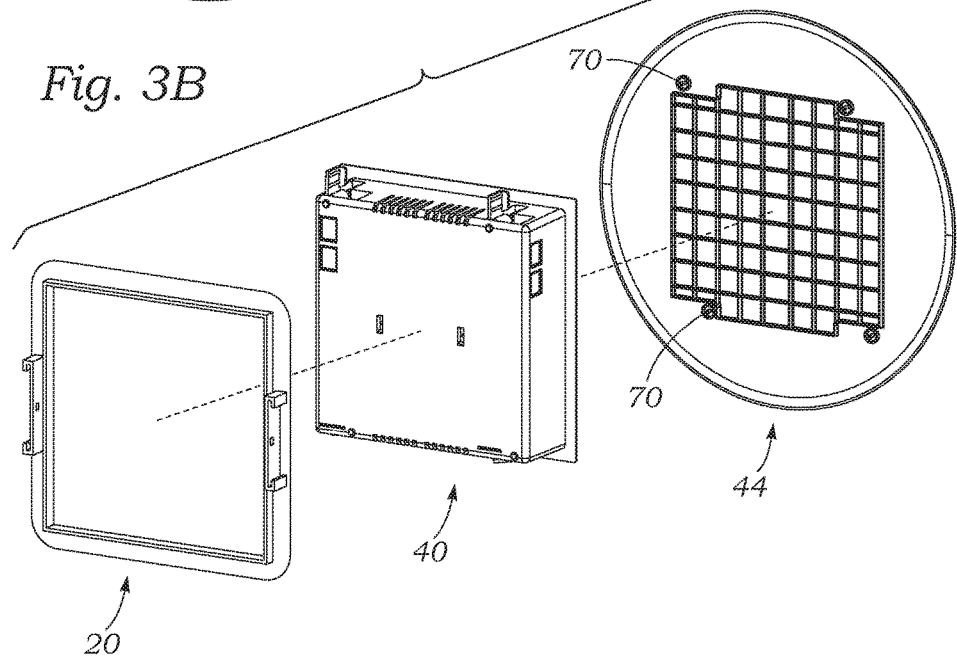

FIG. 3A and FIG. 3B show the WAP enclosure 40 and rough-in bracket 20 along with an alternative circular aesthetic cover 44. The magnets 70 on the rear face of the circular cover 44 have the same spatial arrangement as with the square cover 42 and thus align with the actuating screws 62 in the WAP enclosure 40.

FIG. 4 is a perspective exploded view of the WAP enclosure 40 and rough-in bracket 20. The dog ears 60 are shown in their retracted positions enabling insertion of the rear housing of the enclosure 40 through the square window in the bracket 20. The dog ears 60 are also shown in phantom in their extended positions. FIG. 5 shows the enclosure 40 assembled with the rough-in bracket 20, and FIG. 6 is an enlarged view showing actuation of one rotatable dog ear 60 behind the rough-in bracket.

As shown in FIG. 5, the positions of the dog ears 60 and associated actuation actuating screws 62 are not symmetric across the longitudinal walls 54. That is, because each of the dog ears 60 is rotated in the same direction to extend them from their retracted positions, one of each pair of dog ears 60 on each longitudinal wall 54 may be mounted close to a corner of the rear housing, while the other of the pair must be inset a short distance to allow room for the dog ear 60 to rotate into a recess 64 in the wall 54. With reference to FIG. 5, the right actuating screw 62a at the top is located at a close first distance to the intersection of the upper longitudinal sidewall 54a and a right adjacent lateral sidewall 52a, and the left actuating screw 62b is located at a farther second distance from the intersection of the upper longitudinal sidewall 54a and the left adjacent lateral sidewall 52b. A similar but mirror image spacing of screws 62 is provided in the lower longitudinal sidewall 54b. Consequently, the screws 62 are arranged in a parallelogram spatial arrangement 72. Furthermore, the magnets 70 on the rear face of the covers 42, 44 are also arranged in the same parallelogram spatial arrangement to line up with the screws 62. This means that the covers 42, 44 may be attached to the WAP enclosure 40 in only two orientations 180° apart. In a preferred embodiment, the sides 52, 54 are equal lengths and the spatial arrangement 72 is a rhombus.

FIG. 4, FIG. 5 and FIG. 6 illustrate several other advantageous features of the WAP enclosure 40. First of all, as mentioned above, a series of vent slots or apertures 80 are provided in both of the longitudinal walls 54, but not on the lateral walls 52. The WAP enclosure 40 is intended to be installed with the lateral walls 52 facing toward the adjacent joists 22 so that the vent apertures 80 align with the longitudinal airspace between the joists and thus permit efficient cooling of the WAP within the enclosure 40. Vents are not included in the rear face 50 to help eliminate dust and insulation incursion from settling by gravity into the enclosure 40, which might interfere with the electronics of the wireless access point device.

The rear face 50 may include one or more mounting studs 82. The mounting studs 82 may be paired. The mounting studs 82 may be raised from the surrounding flat surface and configured to receive screws (not shown). The screw holes (round embossments) may be reinforced. Many wireless access point devices have at least one pair of spaced holes in or on their enclosure, often at least one such pair is spaced a standard distance apart. These holes are commonly in the back of the WAP device's enclosure. There is typically a slot adjacent to and opening to each hole. The mounting studs 82 may be positioned to locate the screw holes at the same locations as conventional mounting holes of WAP devices. Screws may be threaded into the mounting studs 82 with at least a small part of the screw's shaft exposed. The screw heads may then be inserted into the holes, and the screws' shafts slid into the slots. The WAP device is therefore retained securely by the screws in the mounting studs 82. This same attachment technique is often used to attach smoke detectors to wall- or ceiling-mounted brackets.

Advantageously, the mounting studs 82 may also include small apertures 84 through which zip ties (not shown) can be passed. That is, the apertures 84 provide a catch-all solution to secure nearly any type of WAP devices within the enclosure 40. The mounting studs 82 may therefore be made of materials and size, and disposed within the enclosure 40, so as to secure WAP devices either using screws in the screw holes or using zip ties through the apertures 84.

Finally, the WAP enclosure 40 features two different locations for knockouts for passage of ethernet and power cables. With reference to FIG. 4, a pair of knockouts 90 are shown in a first one of the lateral sidewalls 52, and a second pair of knockouts 92 are provided in the rear face 50 adjacent to the opposite lateral sidewall 52. Each of the knockouts 90, 92 are sized to closely receive keystones, or terminal jacks, of ethernet cables, so that the keystones can be mounted directly into the aperture. The knockouts 90, 92 allow the keystones or jacks to be mounted outside the enclosure 44 external ethernet termination and also inside for internal ethernet termination. The knockouts 90, 92 are paired to allow for daisy chaining of WAP devices.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A kit for securing a wireless access point device behind a wall or ceiling surface and between and to adjacent longitudinal structural joists laterally spaced apart a dimension A, comprising:
   a) a rough-in bracket comprising a continuous frame member surrounding a window having a rectilinear shape, the window having a lateral dimension less than the dimension A between the adjacent joists;
   b) a pair of mounting straps connected to opposite lateral sides of the frame member each having a length sufficient to extend to the adjacent joists for attachment thereto;
   c) an enclosure including a rectilinear rear housing defined by a rear face and a pair of parallel lateral sidewalls connected at right angle corners to a pair of parallel longitudinal sidewalls both extending forward from the rear face, and a front facing that extends laterally and longitudinally outward from the rear housing along a front edge of the lateral and longitudinal sidewalls, wherein the front facing defines an opening into an enclosure cavity formed within the rear housing sized to receive a wireless access point device therein and having mounting points for securing the wireless access point device within the enclosure cavity, wherein the rear housing has a shape to closely fit through the frame member window with the front facing sized too large to fit through the window;
   d) a pair of rotatable dog ears provided in both of the longitudinal sidewalls but not the lateral sidewalls and spaced rearwardly from the front facing, the rotatable dog ears being sized to extend outward from the rear housing beyond the window and behind the frame member so as to secure the enclosure to the rough-in bracket, wherein each of the dog ears rotates about a front-to-rear axis and is fastened to an actuating bolt having a forward-facing head approximate flush with the front facing; and
   e) an aesthetic cover configured to attach to the front facing and occlude the opening, the aesthetic cover sized to extend outward beyond the front facing so as to completely mask the enclosure.

2. The kit of claim 1, further including a series of vent apertures provided in each of the longitudinal sidewalls but not in the lateral sidewalls.

3. The kit of claim 2, wherein there are no vent apertures formed in the rear face of the rear housing.

4. The kit of claim 1, further including a first pair of knockouts provided in a first one of the lateral sidewalls each sized to closely receive and hold a cable jack, and a second pair of knockouts provided in the rear face each sized to closely receive and hold a cable jack, the second pair of knockouts the located adjacent a second one of the lateral sidewalls.

5. The kit of claim 1, wherein the mounting points include a pair of reinforced raised mounting studs in the rear face of the rear housing having central holes configured to receive screws and spaced apart a standard distance for inserting the screw heads into the pair of mounting holes of the wireless access point device when placed within the enclosure cavity and secure the wireless access point device within the enclosure cavity.

6. The kit of claim 4, further including zip tie apertures located in the rear face at the base of each of the mounting studs for passing zip ties as a second way to secure the wireless access point device within the enclosure cavity.

7. The kit of claim 6, wherein the rear face of the rear housing has no apertures other than the zip tie apertures.

8. The kit of claim 1, wherein each of the actuating bolts is made of a ferromagnetic material, the aesthetic cover having magnets on a rear face in the same number and in the same spatial arrangement as the actuating bolts such that attraction of the magnets to the actuating bolts retains the cover over the enclosure opening.

9. The kit of claim 8, wherein each pair of rotatable dog ears in the longitudinal sidewalls has a first actuating bolt located at a close first distance to an intersection of that longitudinal sidewall and a first adjacent lateral sidewall, and a second actuating bolt located at a second distance from an intersection of that longitudinal sidewall and a second adjacent lateral sidewall, the second distance being greater than the first distance, the four actuating bolts defining a parallelogram pattern and the cover magnets also being arranged in the same parallelogram pattern so as to match up with the actuating bolts.

10. The kit of claim 1, wherein the opening of the rectilinear rear housing is square with the lengths of the lateral and longitudinal sidewalls being equal and the aesthetic cover is also square.

11. The system of claim 1, wherein the opening of the rectilinear rear housing is square with the lengths of the lateral and longitudinal sidewalls being equal and the aesthetic cover is circular.

12. A method of installing a wireless access point device behind a wall or ceiling surface and between and to adjacent longitudinal structural joists laterally spaced apart a dimension A, comprising:
   a) providing a rough-in bracket comprising a continuous frame member surrounding a window having a rectilinear shape, the window having a lateral dimension less than the dimension A between the joists;

b) attaching a pair of mounting straps connected to opposite lateral sides of the frame member to the adjacent joists;

c) constructing the wall or ceiling surface across a series of the joists;

d) cutting an aperture in the wall or ceiling surface that registers closely with the window in the rough-in bracket;

e) providing an enclosure including a rectilinear rear housing defined by a rear face and a pair of parallel lateral sidewalls connected at right angle corners to a pair of parallel longitudinal sidewalls both extending forward from the rear face, and a front facing that extends laterally and longitudinally outward from the rear housing along a front edge of the lateral and longitudinal sidewalls, wherein the front facing defines an opening into an enclosure cavity formed within the rear housing sized to receive a wireless access point device therein and having mounting points for securing the wireless access point device within the enclosure cavity, wherein the rear housing has a shape to closely fit through the frame member window with the front facing sized too large to fit through the window, the enclosure further including a pair of rotatable dog ears in both of the longitudinal sidewalls but not the lateral sidewalls and spaced rearwardly from the front facing, the rotatable dog ears being sized to extend outward from the rear housing beyond the window and behind the frame member so as to secure the enclosure to the rough-in bracket, wherein each of the dog ears rotates about a front-to-rear axis and is fastened to an actuating bolt having a forward-facing head approximate flush with the front facing;

f) passing the rear housing of the enclosure through the aperture in the wall or ceiling surface and through the frame member window until the front facing contacts the window;

g) rotating the dog ears on the enclosure to extend outward from the rear housing beyond the window and behind the frame member so as to secure the enclosure to the rough-in bracket;

h) inserting a wireless access point device into the cavity and securing the wireless access point device therein using the mounting points; and i) attaching an aesthetic cover to the front facing, the cover occluding the opening and sized to extend outward beyond the front facing so as to completely mask the enclosure.

13. The method of claim 12, wherein the enclosure includes a first pair of knockouts provided in a first one of the lateral sidewalls each sized to closely receive and hold a cable jack, and a second pair of knockouts provided in the rear face each sized to closely receive and hold a cable jack, the second pair of knockouts the located adjacent a second one of the lateral sidewalls, the method including removing one of the first and second pair of knockouts and passing a cable therethrough and attaching the cable to the wireless access point device.

14. The method of claim 12, wherein the mounting points include a pair of reinforced raised mounting studs in the rear face of the rear housing having central holes configured to receive screws and spaced apart a standard distance for inserting the screw heads into the pair of mounting holes of the wireless access point device when placed within the enclosure cavity and secure the wireless access point device within the enclosure cavity, the method including inserting screws into the mounting studs and securing the mounting holes of the wireless access point device on the screws.

15. The method of claim 12, wherein the mounting points include a pair of reinforced raised mounting studs in the rear face of the rear housing having central holes configured to receive screws and spaced apart a standard distance for inserting the screw heads into the pair of mounting holes of the wireless access point device when placed within the enclosure cavity and secure the wireless access point device within the enclosure cavity, the method including inserting screws into the mounting studs and further including zip tie apertures located in the rear face at the base of each of the mounting studs for passing zip ties as a second way to secure the wireless access point device within the enclosure cavity, the method including passing zip ties through the zip tie apertures and securing the wireless access point device within the cavity with the zip ties.

16. The method of claim 12, wherein each of the actuating bolts is made of a ferromagnetic material, the aesthetic cover having magnets on a rear face in the same number and in the same spatial arrangement as the actuating bolts such that attraction of the magnets to the actuating bolts retains the cover over the enclosure opening, the step of attaching the cover including matching up the magnets in the cover with the actuating bolts.

17. The method of claim 16, wherein each pair of rotatable dog ears in the longitudinal sidewalls has a first actuating bolt located at a close first distance to an intersection of that longitudinal sidewall and a first adjacent lateral sidewall, and a second actuating bolt located at a second distance from an intersection of that longitudinal sidewall and a second adjacent lateral sidewall, the second distance being greater than the first distance, the four actuating bolts defining a parallelogram pattern and the cover magnets also being arranged in the same parallelogram pattern so as to match up with the actuating bolts.

18. The method of claim 12, wherein the opening of the rectilinear rear housing is square with the lengths of the lateral and longitudinal sidewalls being equal and the aesthetic cover is also square.

19. The method of claim 12, wherein the opening of the rectilinear rear housing is square with the lengths of the lateral and longitudinal sidewalls being equal and the aesthetic cover is circular.

* * * * *